United States Patent
Dietz et al.

(10) Patent No.: US 9,958,959 B2
(45) Date of Patent: May 1, 2018

(54) METHOD AND DEVICE FOR DETECTING MOVEMENT ON A DISPLAY AREA IN A MOTOR VEHICLE

(71) Applicant: VOLKSWAGEN AG, Wolfsburg (DE)

(72) Inventors: Jan-Peter Dietz, Altenholz (DE); Jan Neumann, Braunschweig (DE)

(73) Assignee: Volkswagen AG (DE)

( * ) Notice: Subject to any disclaimer, the term of this patent is extended or adjusted under 35 U.S.C. 154(b) by 3 days.

(21) Appl. No.: 15/176,573

(22) Filed: Jun. 8, 2016

(65) Prior Publication Data

US 2016/0364014 A1 Dec. 15, 2016

(30) Foreign Application Priority Data

Jun. 11, 2015 (DE) .................. 10 2015 210 657

(51) Int. Cl.
| | |
|---|---|
| *G06F 3/03* | (2006.01) |
| *B60K 37/06* | (2006.01) |
| *G06F 3/0362* | (2013.01) |
| *G06F 3/041* | (2006.01) |
| *B60K 35/00* | (2006.01) |
| *G06F 3/039* | (2013.01) |

(52) U.S. Cl.
CPC ............ *G06F 3/0304* (2013.01); *B60K 35/00* (2013.01); *B60K 37/06* (2013.01); *G06F 3/039* (2013.01); *G06F 3/0362* (2013.01); *G06F 3/041* (2013.01); *B60K 2350/102* (2013.01); *B60K 2350/104* (2013.01); *B60K 2350/1028* (2013.01); *B60K 2350/203* (2013.01); *B60K 2350/2039* (2013.01)

(58) Field of Classification Search
CPC .... G06F 3/0362; G06F 3/0488; G06F 3/0312; G06F 3/041; G06F 3/04847; B60K 2350/102; B60K 37/06; B60K 2350/104; B60K 2350/1028; B60K 35/00; B60K 2350/1024; B60K 2350/203; G01C 21/3664
USPC .......... 345/184, 173, 156; 362/23.22, 23.04; 200/179
See application file for complete search history.

(56) References Cited

U.S. PATENT DOCUMENTS

| | | | |
|---|---|---|---|
| 7,489,303 B1* | 2/2009 | Pryor ..................... | B60K 35/00 345/173 |
| 2015/0169080 A1* | 6/2015 | Choi ....................... | G06F 3/041 345/174 |

FOREIGN PATENT DOCUMENTS

| | | |
|---|---|---|
| DE | 10205641 A1 | 8/2003 |
| DE | 102006043208 A1 | 3/2008 |
| DE | 102007005889 A1 | 7/2008 |
| DE | 102008041649 A1 | 3/2010 |
| EP | 1637976 A1 | 3/2006 |
| EP | 1643214 A2 | 4/2006 |
| WO | 2007038369 A2 | 4/2007 |

* cited by examiner

*Primary Examiner* — Koosha Sharifi-Tafreshi
(74) *Attorney, Agent, or Firm* — Barnes & Thornburg LLP

(57) ABSTRACT

A method for detecting an adjusting movement of an adjusting element located on a display area in a motor vehicle, the adjusting element serving for operating at least one function. At least part of the light emitted from the display area is used for detecting the adjusting movement of the adjusting element. This makes a reliable detection of the adjusting movement possible. A compact and robust device for carrying out the method is also disclosed.

15 Claims, 4 Drawing Sheets

METHOD AND DEVICE FOR DETECTING MOVEMENT ON A DISPLAY AREA IN A MOTOR VEHICLE

PRIORITY CLAIM

This patent application claims priority to German Patent Application No. 10 2015 210 657.8, filed 11 Jun. 2015, the disclosure of which is incorporated herein by reference in its entirety.

SUMMARY

Illustrative embodiments relate to a method for detecting an adjusting movement of an adjusting element located on a display area in a motor vehicle. Illustrative embodiments also relate to a device for carrying out the disclosed method.

BRIEF DESCRIPTION OF THE DRAWINGS

Exemplary embodiments are presented in the drawings and are explained in more detail in the description that follows. In this case, the same reference signs relate to components that are the same, comparable or functionally the same, with corresponding or comparable properties being achieved even if their description is not repeated. In the drawings.

DETAILED DESCRIPTION

Figure 1:
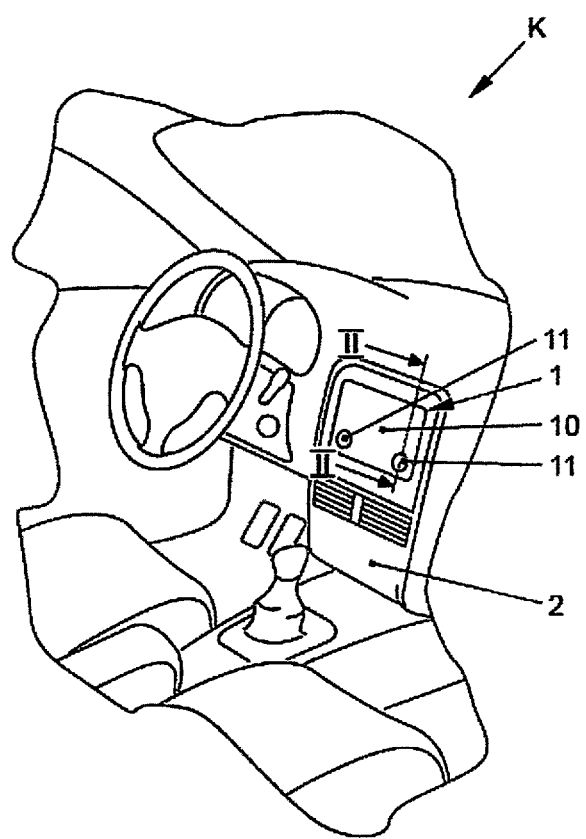
FIG. 1 schematically shows the passenger compartment of a motor vehicle with a device that operates by the disclosed method.

Disclosed embodiments provide a method for detecting an adjusting movement of an adjusting element located on a display area in a motor vehicle, the adjusting element serving for operating at least one function.

Such function may be, in particular, a function of a vehicle's own comfort and/or infotainment system, such as, for example:
- a climate control system (for example, temperature and/or ventilation setting)
- an audio system (for example, volume control)
- a communication system (for example, selection and activation of contacts)
- a navigation system (for example, selection of destinations)
- an on-board system (for example, activation of particular messages).

The enumeration is given purely by way of example and should not be regarded as exhaustive.

A method of the general type disclosed herein has been known from DE 10 2006 043 208 A1. That disclosed input device has a touch-sensitive operator control area for setting particular functions. To make it easier to operate, the input device, which is formed as a commercially available touchscreen, is additionally provided with a purely mechanically operating adjusting element. The adjusting element is arranged above the touchscreen and is formed as a rotary adjuster. The rotary adjuster has a fixed, lower part with spring tabs, which is adhesively mounted on the touchscreen, and an operator control part rotatably mounted on it. When the rotatable operator control part is turned, an annular sawtooth structure on the underside of the operator control part interacts with the spring tabs in such a way that it presses them against the surface of the touchscreen and consequently an adjusting movement of the adjusting element can be detected. This has the consequence that a particular function is triggered.

Furthermore, the rotary adjuster in the operator control part has a separate display area, to which function-related information of the touchscreen can be passed by way of a light guide.

Likewise, in DE 10 2008 041 649 A1 there is a description of an operator control device in a vehicle in which adjusting elements formed as turning or turning/pressing adjusters are arranged overlapping peripherally in relation to a touch sensitive screen. It is intended in this way to achieve benefits in terms of overall space, so that a larger screen can be provided or space for other devices can be created.

However, in the case of the aforementioned documents, a detection of adjusting movements takes place substantially by mechanical, sometimes complex means.

It is thus proposed that at least part of the light emitted from the display area is used for detecting the adjusting movement of the adjusting element.

In this way, a reliable method for detecting an adjusting movement can be provided. Susceptibilities to faults as a result of complicated mechanical transmission elements can be avoided.

According to at least one disclosed embodiments, at least one region with an optical coding is formed in one part of the display area. Light radiated from this region is converted into a light signal that can be detected and evaluated by a light detection and evaluation unit and is fed to the latter.

This development of the method allows the reliability of the method to be improved. In particular, the optical coding allows the detectability and the evaluability of an adjusting movement of the adjusting element to be improved.

As already mentioned, the disclosed embodiments also relate to a device for carrying out the disclosed method.

The device has at least one display area, mounted on which is at least one adjusting element, by the adjusting movement of which the operator control of at least one function can be carried out.

The type of adjusting movement depends here on the type of adjusting element. It may be a rotational movement (in the case of an adjusting element formed as a rotary adjuster) or a translational movement (in the case of an adjusting element formed as a slide control). Combinations of rotational and translational adjusting movements are also conceivable if, for example, the adjusting element is formed as a turning/pressing adjuster.

According to the disclosed embodiments, an optical coding is present or can be produced on the display area in the region of the adjusting element. Arranged over the coding is a diaphragm with at least one opening. Light that can be produced by the display area can pass through the at least one opening in the diaphragm in the region of the coding and can be fed by way of a light guide to at least one light detection and evaluation unit.

In this way, a very reliable and robust device can be provided.

For detecting a pressing movement in the case of an adjusting element formed as a turning/pressing adjuster, it is conceivable, for example, that the light signal fed to the light detection and evaluation unit is interrupted or changed again by pressing the adjusting element. The evaluation logic may then be formed such that an interruption or change of the light signal is interpreted as a pressing movement and a corresponding switching operation is triggered.

The interruption of the light signal may be accomplished, for example, by an additional diaphragm, which is moved into the path of rays when the adjusting element is pressed down. A change of the light signal can be achieved by use of an optical filter element, which is moved into the path of rays when the adjusting element is pressed down.

The device may be developed by providing that at least one coding unit with at least three coding areas of the same outline arranged next to one another is present or can be produced as the coding. A different kind of light signal can be produced by each coding area. The at least one opening in the diaphragm approximately corresponds in its outline to the outline of a coding area and can be brought into congruent alignment with one of the areas in each case by an adjusting movement of the adjusting element.

This refinement ensures good detectability of an adjusting movement, in particular, its direction.

Optionally, a different color and/or a different pattern is present or can be produced in each of the coding areas. Such a coding can be produced very easily by commonly available display areas, which may, for example, also be formed as touch-sensitive input and output areas.

According to another disclosed embodiment, a number of such coding units are present or can be produced as the coding. The diaphragm has a number of identical openings, the arrangement of the coding units and the openings in the diaphragm being chosen such that all of the openings can be simultaneously brought into congruent alignment with such coding areas of the coding units by which an identical light signal can be produced.

In this way, the light produced by the display area can be optimally utilized and the intensity of the light signal to be evaluated can be noticeably increased.

To be able to provide a reliable coding in a particularly easy way, in an expedient refinement, three coding areas respectively with the colors red, yellow and green are present or can be produced as the coding unit.

At least one further light guide may be arranged between the coding that is present or can be produced and the diaphragm, to optimize the transport of the light from the display area to the light detection and evaluation unit.

Finally, according to another development, it is proposed that the adjusting element should be provided with a partially light-transmissive coating, which has been applied to a light guide. In this case, light that can be produced by the display area can be fed by way of the light guide to the coating. This allows the light that can be produced by the display area also to be used in an easy way for illuminating the adjusting element.

In FIG. 1, the passenger compartment of a motor vehicle K can be seen in the region of a central console 2. An input and display device 1 is integrated in the central console 2. The input and display device 1 comprises a display area 10 on which two adjusting elements 11, i.e. a circular rotary adjuster, are mounted, optionally adhesively mounted.

The display area 10 may furthermore also be formed as a touch-sensitive display area, i.e., a touchscreen, and the adjusting elements 11 may be formed as turning/pressing adjusters (not represented any more specifically).

Adjusting movements of the adjusting elements 11, in particular, turning movements, allow functions of a vehicle's own comfort and/or infotainment system (not represented any more specifically) to be operated.

Figure 2:
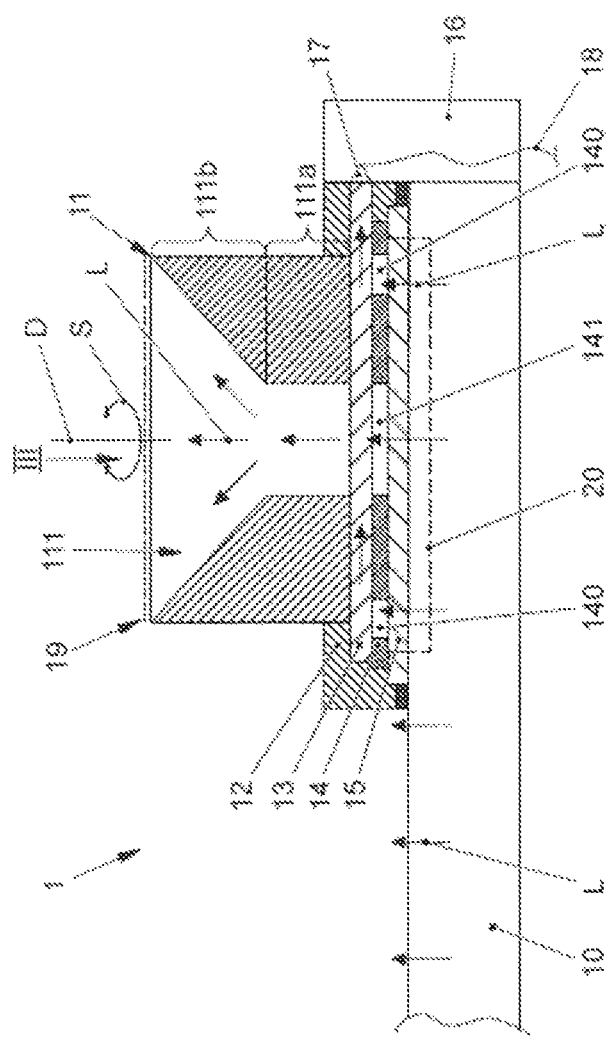
FIG. 2 schematically shows a sectional representation through the device in the region of an adjusting element according to the sectional lines II from FIG. 1.

The input and display device 1 in the region of an adjusting element 11 is now described in more detail on the basis of FIG. 2.

The adjusting element 11 is rotatable about an axis of rotation D (cf. double-headed arrow of an adjusting movement S) and adhesively mounted on the display area 10 by a mounting 12. Integrated in the adjusting element 11 is a light guide 111, which, starting from a rear side of the adjusting element 11, extends up to an operator-side upper side. In this case, the light guide 111 is of a cross-sectionally circular form and has a first, cylindrical portion 111a. The cylindrical portion 111a has a much smaller outside diameter than the adjusting element 11.

The cylindrical portion 111a goes over in one piece into a second portion 111b, the outside diameter of which steadily increases until, at the operator-side upper side of the adjusting element 11, it approximately reaches the outside diameter of the latter.

A coating 19 has been applied to the adjusting element 11 or the light guide 111, on the operator-side surface. The coating 19 is of a partially transparent or at least translucent form.

Connected to the adjusting element 11 on the underside, for rotation therewith, is a diaphragm 14. The diaphragm 14 is of a circular form and has a multiplicity of peripheral openings 140, through which light L that can be produced by the display area 10 can pass (cf. also FIG. 4).

The diaphragm 14 is covered on the underside and the upper side by two light guides 15 and 13, that is to say is enclosed by the light guides 13 and 15. The light guides 13 and 15 may be made of colorless transparent material.

Underneath the light guide 15, an optical coding 20 is present or can be produced (indicated by dashed lines) on the display area 10.

In the region of the optical coding 20, light L that can be produced by the display area 10 is optimally directed with the aid of the light guide 15 to the diaphragm 14 and can pass through the openings 140 there. The light L passing through the openings 140 is then partly deflected through the light guide 13 in the direction of a light detection and evaluation unit 17, which is fastened laterally to the display area 10 by a housing-like mounting 16. A signal and power line to electronics that are not represented any more specifically is denoted by 18.

Another part of the light L passes through a central opening 141 in the diaphragm 14 to the light guide 111, by which the light L is directed up to the coating 19. At light-transmissive regions of the coating 19, the light L can emerge into the passenger compartment of the motor vehicle K. The light-transmissive regions of the coating 19 may be formed as symbols, with which the operability of particular functions is indicated.

Figure 3:
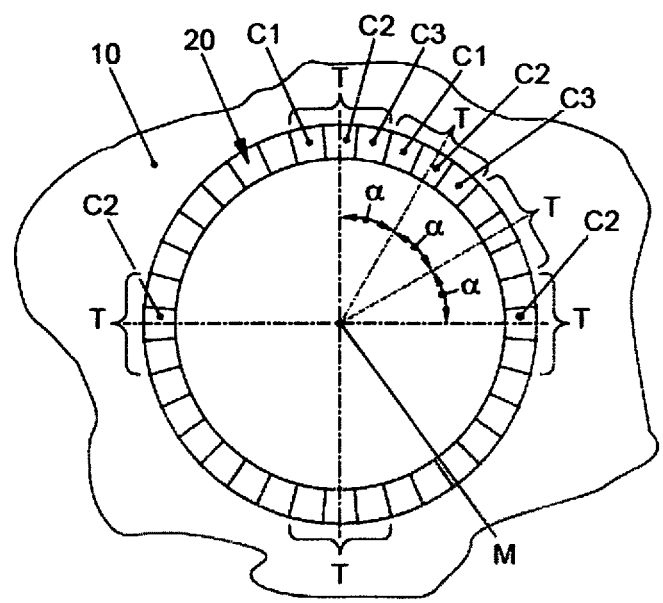
FIG. 3 schematically shows a representation according to view III from FIG. 2 of a coding which is present or can be produced on a display area of the device, the components located over the coding having been omitted.

As a result of the coding 20, the light rays L that can be produced by the display area 10 are radiated as light rays or light patterns of various kinds. It is only by the diaphragm 14 that the different light rays L are converted into a light signal that can be detected and evaluated by the light detection and evaluation unit 17. This is described in more detail below on the basis of FIGS. 3 and 4:

Thus, the optical coding 20 that is present or can be produced on the display area 10 is presented in detail in FIG. 3. The coding 20 has an annular outline, which is divided up along its circumference into a multiplicity of coding areas C1, C2 and C3. The coding 20 is arranged concentrically in relation to a midpoint M.

The coding areas C1, C2 and C3 are the same with regard to their form and area. They differ, however, with regard to their color. The coding areas C1 have or emit a red color, the coding areas C2 a yellow color and the coding areas C3 a green color.

The coding areas C1, C2 and C3 are arranged one after the other or one following the other in a clockwise sense, it being possible for three coding areas C1, C2 and C3 to be respectively regarded as a coding unit T.

As can be seen from FIG. 3, 12 coding units T are arranged along the annular coding 20 with a division α of 30°.

As a departure from the exemplary embodiment, however, a greater or smaller number of coding units T is also conceivable. Each coding unit T may also have more than three coding areas. Furthermore, a different coding than a color coding may also be used. For example, the coding areas C1, C2 and C3 may also have different patterns.

Figure 4:
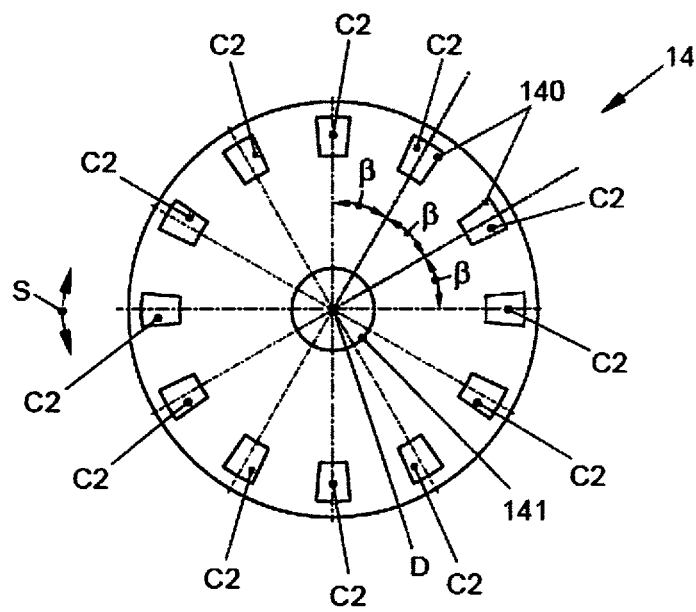
FIG. 4 schematically shows a representation according to view III from FIG. 2 of a diaphragm located over the coding, the components located over the diaphragm having been omitted.

As becomes clear from FIG. 4, the diaphragm 14 is of a circular form and has concentrically in relation to its axis of rotation D the central opening 141 and also the peripheral openings 140.

All of the openings 140 are the same in form and area. In addition, the openings 140 are also identical in form and area to the coding areas C1, C2 and C3. The openings 140 are arranged along the circumference of the diaphragm 14 with a division β, the division β corresponding to the division α. In the exemplary embodiment, it is therefore also 30°.

It is thus possible that the openings 140 in the diaphragm 14 can be brought into congruent alignment with one of the coding areas C1, C2 or C3 by an adjusting movement S (cf. double-headed arrow), which in this case is a turning movement.

If the openings 140 are brought into congruent alignment with the coding areas C1, consequently only red light reaches the light detection and evaluation unit 17.

When the openings 140 are congruently aligned with the coding areas C2, it is only yellow light, whereas a congruent alignment of the openings 140 with the coding areas C3 leads to a green color signal for the light detection and evaluation unit 17.

A change in the color of the color signals arriving at the light detection and evaluation unit 17 allows the direction of rotation of the adjusting movement S to be clearly identified by a downstream evaluation logic (not represented any more specifically) and allows corresponding influencing of a function that is to be controlled by the operator to be initiated.

If, for example, the color changes red/yellow, yellow/green or green/red are established, an adjusting movement S in the clockwise sense is taking place. A color change green/yellow, yellow/red or red/green on the other hand indicates an adjusting movement S in the counterclockwise sense.

The magnitude of the adjusting movement S can be determined by the number of color changes.

In FIG. 4, which shows the diaphragm 14 arranged over the coding 20 and concentrically in relation to its midpoint M, the openings 140 have just been brought into congruent alignment with the coding areas C2. Therefore, yellow light is allowed to pass through the openings 140.

Figure 5:
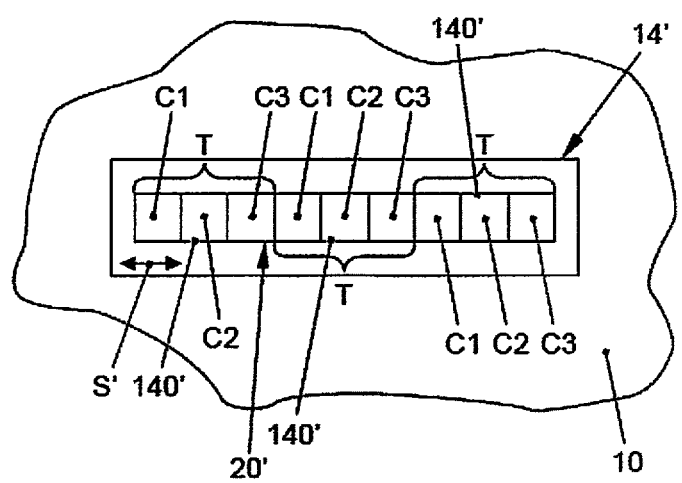
FIG. 5 schematically shows a representation comparable to FIG. 4 of the diaphragm located over a coding in a further exemplary embodiment.

The coding and the diaphragm do not necessarily have to be circularly arranged. This is shown by FIG. 5.

A coding 20', in which the coding areas C1, C2 and C3 are arranged one behind the other in the longitudinal direction, can be seen here. By way of example, altogether three coding units T are present.

Arranged over the coding 20' in a longitudinally displaceable manner is a diaphragm 14' of a rectangular outline. The diaphragm 14' is fixedly connected to an adjusting element, i.e. a slide control, which is located over it but not represented any more specifically.

An adjusting movement S', that is to say a longitudinal displacement of the slide control, allows three openings 140' of the diaphragm 14' to be respectively brought in turn into congruent alignment with the coding areas C1, C2 or C3. In the figure, a congruent alignment with the coding areas C2 (color yellow) has been completed.

The disclosure is not restricted to the exemplary embodiment or embodiments given above. They have only been used for explaining the basic idea of the disclosure in general. Rather, the disclosure can also accept within the scope of its protection exemplary embodiments or forms other than those described above. In that case, the disclosure may also have, in particular, features that represent a combination of individual features of the respective claims.

LIST OF REFERENCE SIGNS

1 Input and display device
2 Central console
10 Display area
11 Adjusting element
12 Mounting
13 Light guide
14, 14' Diaphragm
15 Light guide
16 Mounting for light detection and evaluation unit
17 Light detection and evaluation unit
18 Signal and power line
19 Coating
20 Optical coding
111 Light guide
111a First portion
111b Second portion
140, 140' Openings
α Division
β Division
C1 Coding area red
C2 Coding area yellow
C3 Coding area green
D Axis of rotation
K Motor vehicle
L Light
M Midpoint
S, S' Adjusting movement
T Coding unit

The invention claimed is:

1. A method for detecting an adjusting movement of an adjusting element located on a display area in a motor vehicle, the adjusting element operating at least one function, the method comprising:
  using at least part of light emitted from the display area to detect the adjusting movement of the adjusting element by:
    forming at least one region with an optical coding in one part of the display area;

converting light radiated from this region into a light signal; and detecting and evaluating the light signal using a light detection and evaluation unit to detect the adjusting movement of the adjusting element.

2. The method of claim 1, wherein operator control of the at least one function is carried out by the adjusting movement of the at least one adjusting element, wherein an optical coding is present or produced on the at least one display area in a region of the at least one adjusting element, wherein, arranged over the coding, is a diaphragm with at least one opening, wherein light produced by the at least one display area is able to pass through the at least one opening in the diaphragm in the region of the coding and is fed, by way of at least one light guide, to the at least one light detection and evaluation unit.

3. The method of claim 2, wherein the optical coding includes at least one coding unit with at least three coding areas of the same outline arranged next to one another is present or produced as the coding, a different kind of light signal is produced by each coding area and the at least one opening in the diaphragm approximately corresponds, in its outline, to the outline of a coding area and is configured to be brought into congruent alignment with one of the at least three coding areas by an adjusting movement of the adjusting element.

4. The method of claim 3, wherein a different color and/or a different pattern is present or can be produced in each of the at least three coding areas.

5. The method of claim 3, wherein a plurality of coding units are present or produced in the optical coding and the diaphragm has a plurality of identical openings, the arrangement of the plurality of coding units and the plurality of openings are chosen so all of the openings can be simultaneously brought into congruent alignment with the plurality of coding areas by which an identical light signal is produced.

6. The method of claim 3, wherein the optical coding includes the at least three coding areas respectively with colors red, yellow and green present or produced as the coding unit.

7. The method of claim 2, wherein at least one further light guide is arranged between the optical coding that is present or produced and the diaphragm.

8. The method of claim 2, wherein the adjusting element has a partially light-transmissive coating, which have been applied to a light guide, wherein light is produced by the display area and fed by way of the light guide to the partially light-transmissive coating.

9. A device for detecting an adjusting movement of at least one adjusting element in a motor vehicle, the at least one adjusting element operating at least one function, the device comprising: at least one display area;

at least one adjusting element mounted on the at least one display area; a diaphragm with at least one opening; at least one light detector and corresponding evaluation logic; and at least one light guide, wherein, in response to an adjusting movement of the at least one adjusting element, operator control of the at least one function is carried out, wherein an optical coding is present or produced on the at least one display area in a region of the at least one adjusting element, wherein the at least one opening of the diaphragm is arranged over the optical coding, wherein the at least one light detector detects at least part of light emitted from the at least one display area as an indication of the adjusting movement of the at least one adjusting element, wherein light produced by the at least one display area passes through the at least one opening in the diaphragm in the region of the coding and is input, by way of the at least one light guide, to the at least one light detector for evaluation by the corresponding evaluation logic.

10. The device of claim 9, wherein the optical coding includes at least one coding unit with at least three coding areas of the same outline arranged next to one another is present or produced as the coding, a different kind of light signal is produced by each coding area and the at least one opening in the diaphragm approximately corresponds, in its outline, to the outline of a coding area and is configured to be brought into congruent alignment with one of the at least three coding areas by an adjusting movement of the adjusting element.

11. The device of claim 10, wherein a different color and/or a different pattern is present or can be produced in each of the at least three coding areas.

12. The device of claim 10, wherein a plurality of coding units are present or produced in the optical coding and the diaphragm has a plurality of identical openings, the arrangement of the plurality of coding units and the plurality of openings are chosen so all of the openings can be simultaneously brought into congruent alignment with the plurality of coding areas by which an identical light signal is produced.

13. The device of claim 10, wherein the optical coding includes the at least three coding areas respectively with colors red, yellow and green present or produced as the coding unit.

14. The device of claim 9, wherein at least one further light guide is arranged between the optical coding that is present or produced and the diaphragm.

15. The device of claim 9, wherein the adjusting element has a partially light-transmissive coating, which have been applied to a light guide, wherein light is produced by the display area and fed by way of the light guide to the partially light-transmissive coating.

* * * * *